(12) United States Patent
Hawkins

(10) Patent No.: US 7,736,721 B2
(45) Date of Patent: Jun. 15, 2010

(54) HOLLOW STRUCTURAL MEMBER WITH REINFORCED BULWARK AND PROCESS FOR PRODUCING SAME

(75) Inventor: Stephen Hawkins, Dearborn, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 169 days.

(21) Appl. No.: 11/463,738

(22) Filed: Aug. 10, 2006

(65) Prior Publication Data

US 2008/0036122 A1    Feb. 14, 2008

(51) Int. Cl.
  *B32B 3/00* (2006.01)
  *B32B 3/12* (2006.01)
  *B32B 3/20* (2006.01)
  *E04C 2/54* (2006.01)

(52) U.S. Cl. .................. 428/166; 428/188; 428/178; 52/783.1

(58) Field of Classification Search .................. 428/178, 428/188, 166; 52/783.1
  See application file for complete search history.

(56) References Cited

U.S. PATENT DOCUMENTS

| | | | |
|---|---|---|---|
| 2,985,968 A | 5/1961 | Koch | |
| 4,289,817 A | 9/1981 | Valyi | |
| 4,563,374 A | 1/1986 | Treber et al. | |
| 4,857,258 A | 8/1989 | Le Doux et al. | |
| 4,894,974 A | 1/1990 | Mayhew et al. | |
| 5,020,687 A | 6/1991 | Seizert | |
| 5,040,335 A | 8/1991 | Grimes | |
| 5,044,663 A | 9/1991 | Seizert | |
| 5,114,522 A | 5/1992 | Takado et al. | |
| 5,123,688 A | 6/1992 | Takado et al. | |
| 5,162,092 A | 11/1992 | Klobucar et al. | |
| 5,169,470 A | 12/1992 | Goldberg | |
| 5,194,212 A | 3/1993 | Bonnett | |
| 5,885,515 A | 3/1999 | Hudkins | |
| 6,060,144 A | 5/2000 | Kimura et al. | |
| 6,589,472 B1 | 7/2003 | Benson et al. | |

FOREIGN PATENT DOCUMENTS

| | | | |
|---|---|---|---|
| EP | 1255028 A2 | | 11/2002 |
| JP | 05254001 A | * | 10/1993 |
| JP | 08207129 A | * | 8/1996 |
| JP | 2000158522 A | * | 6/2000 |

* cited by examiner

*Primary Examiner*—David R Sample
*Assistant Examiner*—Catherine Simone
(74) *Attorney, Agent, or Firm*—Brooks Kushman P.C.

(57) ABSTRACT

A hollow structural member including a top wall having an inner surface and a substantially planar outer surface. A bottom wall opposes the top wall so as to define a void therebetween and has at least one bulwark formed therein. Each bulwark has a leading face which is joined to the inner surface of the top wall to form a double-walled bulwark bridging the void. The double-walled bulwark has opposing walls and a reinforcing member that is encapsulated thereby. A process for producing a hollow structural member includes placing a parison between two mold halves before bringing together the first and second mold halves. A movable blade is positioned therein. When in the closed position, movable blade is extended into a cavity defined by the first and second mold halves to form the bulwark in the second portion of the parison to be formed into a bottom wall.

9 Claims, 3 Drawing Sheets

HOLLOW STRUCTURAL MEMBER WITH REINFORCED BULWARK AND PROCESS FOR PRODUCING SAME

BACKGROUND OF THE INVENTION

1. Technical Field

The invention relates generally to molded articles and, more particularly, to a structural member having a strengthened inner rib or reinforced bulwark optionally with an overlay material bonded thereto and a process for producing such a structural member.

2. Prior Art

It is known to provide hollow structural members with a double-walled structure for such applications as load floors in vehicles, shelves, tables, and the like. Conventionally, they should ideally be light in weight, easy to manufacture, inexpensive to produce, and remain relatively rigid in response to the application of reasonable forces.

To impart a decorative effect to a plastic structural member or to improve its feel, an overlay material, e.g., a fabric can be bonded to plastic structural members. This approach can be found in building materials, walls, partitions, doors, and automotive parts, e.g., head rests, arm rests, parcel shelves, and cargo floor lid structural members. For example, Japanese Patent Application Laid-Open No. 6-134842 discloses a hollow plastic article in which reinforcing ribs are provided between walls 80 that defects caused by shrinkage or warping are not evident on the exterior of the walls. In addition, Japanese Patent Publication No. 4-53696 discloses a method for producing a hollow plastic article by blow molding in which an overlay material such as a non-woven fabric is bonded to the exterior face of the article.

Conventional structural members often include stiffening ribs or reinforcing bulwarks that are formed on the inside surface of a bottom wall. The bulwarks have leading faces which are integrally joined to the inside surface of the top wall. See, e.g., U.S. Pat. No. 6,060,144. They are formed by a method in which a hollow plastic molten tube is extruded from the die head of a blow molding machine before being expanded within the mold. This intermediate product is sometimes called a "parison." The parison and if desired an overlay material are positioned between two halves of a mold. Then the parison is blow molded so that the overlay material is simultaneously bonded to the exterior face of the top wall of the structural member.

One disadvantage associated with this method, however, is that when the leading faces of the reinforcing ribs or bulwarks are pressed against the top wall to form an integral union, portions of the overlay material which are located above the leading faces are pressed hard against the surface of the mold cavity. This action may mar the appearance of the resultant structural member by causing press marks on portions of the overlay material which are subjected to pressure. In addition, if the overlay material is a fabric having outwardly protruding fibers, then the fibers may become matted, which further detracts from the appearance of the resultant structural members. This matting phenomenon is caused by the combination of heat from the parison (which is typically at a temperature of about 200 degrees C.) and the pressure applied against the fabric (typically about 10 atm.). Another disadvantage associated with this method is that the formation of the bulwarks may leave a concave indentation in the bottom wall at the points where the leading faces have been joined to the top wall. As a result, the exterior surface of the bottom wall is not a continuous flat surface.

Among the art located in a search that preceded the filing of this application are the following U.S. references: U.S. Pat. Nos. 5,885,515; 5,194,212; 5,169,470; 5,162,092; 5,144,522; 5,123,688; 5,044,663; 5,040,335; 5,020,687; 4,894,974; 4,857,258; 4,563,374; 4,289,817; and 2,985,968.

SUMMARY OF THE INVENTION

In view of the foregoing, a structural member is needed, optionally having an overlay material bonded thereto which improves part performance under loading, and has an aesthetically pleasing appearance, as well as a process for producing such a structural member.

In one aspect of the invention, a hollow structural member includes a top wall having an inner surface and an outer surface. A bottom wall opposes the top wall so as to define a hollow space therebetween. At least one strengthening protrusion ("bulwark" or "rib") is formed therein. Each protrusion has a tip or leading face which is integrally joined to the inner surface of the top wall to form a double-walled bulwark that bridges the hollow space.

For added strength, a preferred embodiment of the invention includes a reinforcement member that is interposed between the walls of the bulwark so that the reinforcement member is sandwiched thereby. Preferably, neither the top nor the bottom edges of the reinforcement member are visible from outside the top or the bottom walls of the hollow structural member.

Each of the double-walled bulwarks has opposing walls that extend from the bottom wall such that an outer surface of the bottom wall includes a notch that remains after the bulwark is formed in a manner to be described.

Optionally, an overlay material is bonded to the outer surface of the top wall. If an overlay material is provided, the material preferably includes a fabric having outwardly protruding fibers. The fabric is preferably comprised of materials such as cotton, hemp, wool, silk, viscose rayon, cupro-ammonium rayon, acetate, rayon, nylon, polyester, acrylic, vinylon, polypropylene, and polyurethane.

The top and bottom walls are preferably comprised of a thermoplastic resin such as polyethylene, polypropylene, ethylene/vinyl acetate copolymers, polyvinyl chloride, ABS (acrylonitrile/styrenelbutadiene), polyamide, polystyrene, polyester, polycarbonate, and modified polyphenylene ether.

The invention also includes a process for producing the hollow structural member. Conventionally, a strengthening protrusion is formed in a blow molding step by a moving blade that has a reinforcing member mounted thereupon. The blade extends inwardly from a mold tool and displaces a flowable wall of the parison. When the blade is extended, the reinforcing member and the wall are urged inwardly into the mold cavity until a leading face of the wall unites with the inside of the tube wall on the opposite side of the mold cavity. Then the moving blade is retracted, leaving the reinforcing member at least partially encapsulated by the walls of the protrusion. Pressure acting on each wall of the protrusion causes the walls to unite. Upon solidification, a structurally reinforced bulwark or rib is formed.

The reinforcement member can be held in place in the open tool by a blade or by pins. When the blade or pins are retracted, semi-molten plastic flows around the reinforcement member, thereby encapsulating it.

These and other features and advantages of the present invention will become apparent upon reading the following detailed description and studying the various figures of the drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENT(S)

The Product

Figure 1:
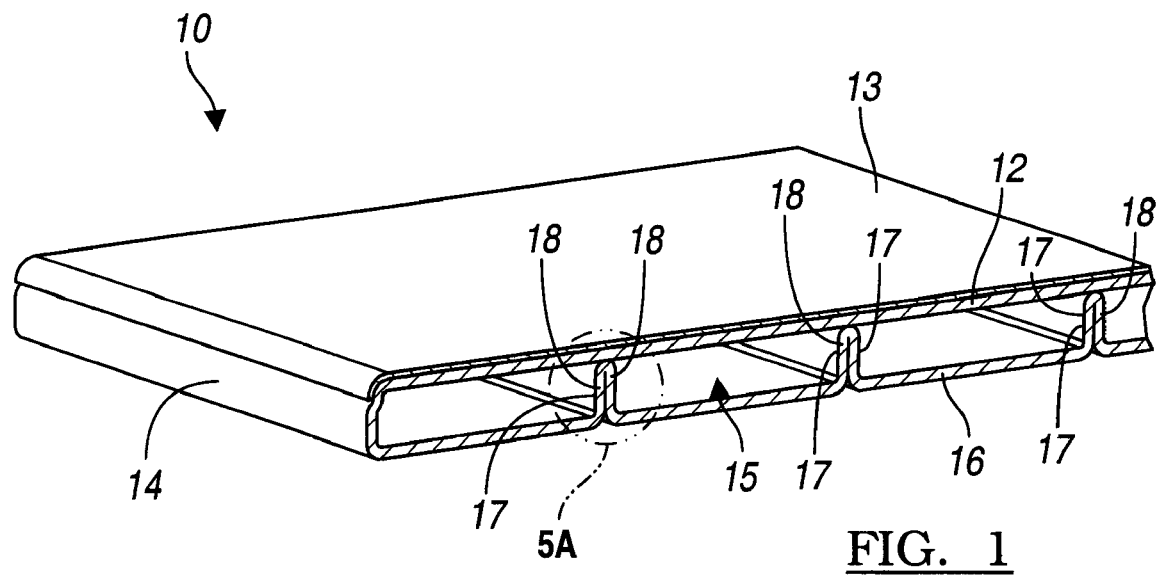
FIG. 1 is a fragmented cross-sectional perspective view of a hollow structural member having an optional overlay material bonded thereto in accordance with one embodiment of the present invention.

FIG. 1 shows one aspect of the invention wherein a hollow structural member has an optional overlay material bonded thereto. As shown therein, structural member 10 includes a hollow double-walled structure with a top wall 12 and bottom wall 16. If present, the cover material 13 is bonded to the outer surface of top wall 12, preferably by a blow molding operation which will be discussed in detail later.

As shown in FIG. 1, a portion of cover material 13 overhangs outside wall 14. The amount of overhang, if any, of cover material 13 may be varied to suit the application for which structural member 10 is intended. Reference numeral 15 indicates a void between top wall 12 and bottom wall 16.

Figure 4:
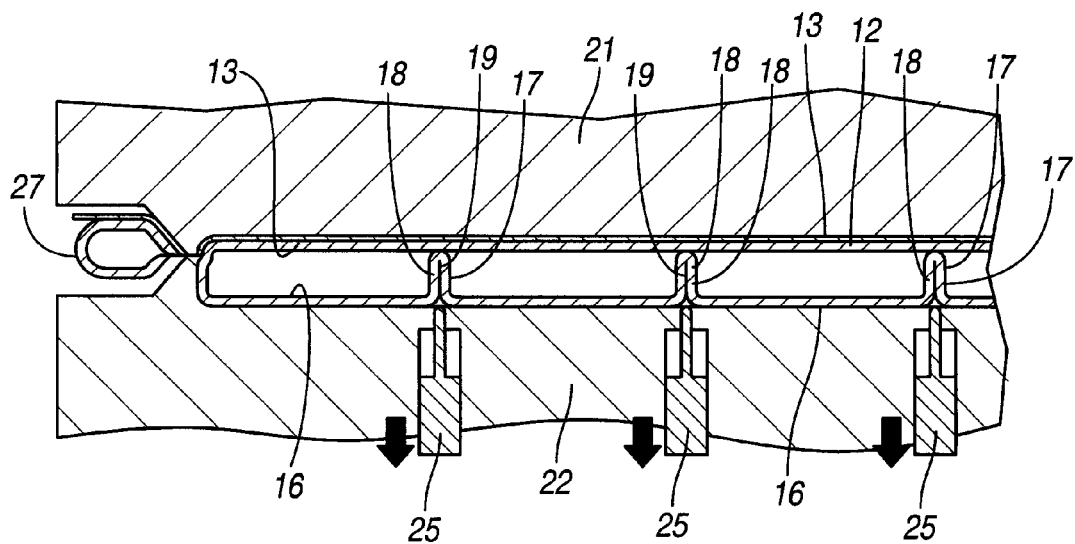
FIG. 4 is an enlarged cross-sectional view taken along line 3-3 of FIG. 2 which illustrates a step wherein the mold is in the closed position and the movable blades are retracted, leaving the reinforcing members in place.
Figure 5A:
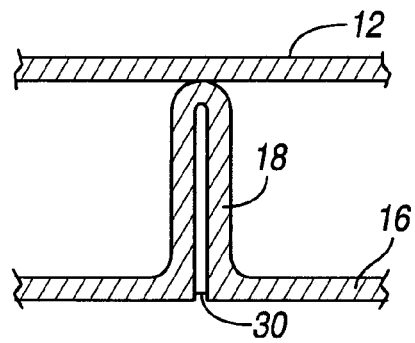
FIGS. 5(A-E) are enlarged cross sectional views of alternate embodiments of the bulwarks and reinforcing members that they encapsulate.
Figure 5B:
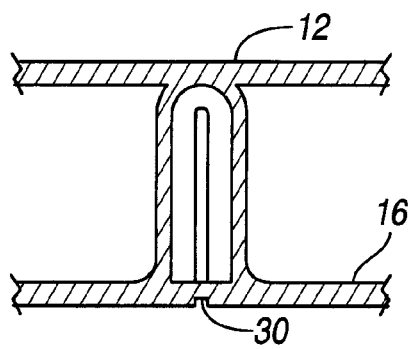
Figure 5C:
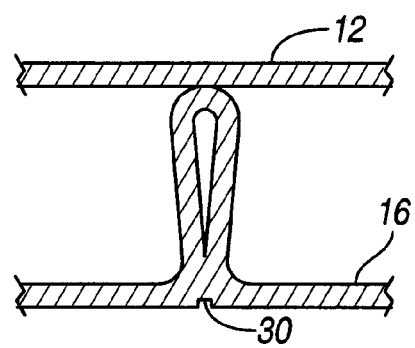
Figure 5D:
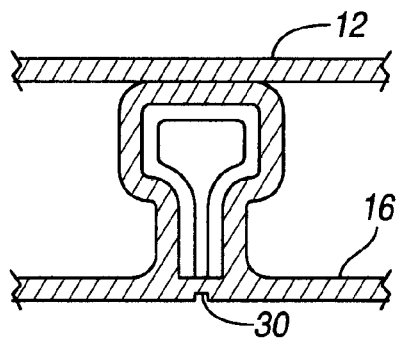
Figure 5E:
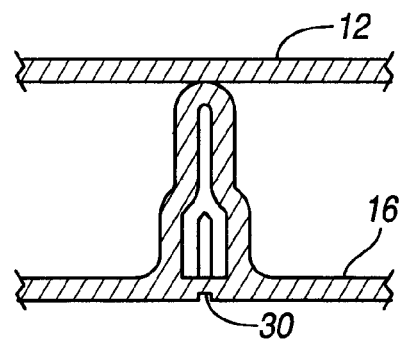

Inner bulwarks 17 bridge the void 15 between top wall 12 and bottom wall 16. Leading faces 18 of bulwarks 17 are integrally joined to top wall 12 by interfacial regions 19 (FIG. 4). Bulwarks 17 may be formed by protruding portions of bottom wall 16 so that leading faces 18 are urged into contact with top wall 12 with a relatively small force, as will subsequently be mentioned in more detail. The integral joining of top wall 12 and bottom wall 16 by means of bulwarks 17 increases the strength and rigidity of structural member 10.

As shown in FIG. 1, bulwarks 17 have a double-walled configuration in which the opposing sides of the protrusions formed in bottom wall 16 have been pressed together so that they encapsulate a reinforcing member 18. The reinforcing member 18 is preferably at least partially encased in the walls of the bulwark 18 so that their presence may not be evident by visual inspection of the outside of the top wall 12 or bottom wall 16 of the structural member 10. Once in place, however, the reinforcing members 18 provide added stiffness and rigidity to the structural member 10.

As used herein, the adjectival words "top" and "bottom" should not be construed in a limiting manner. In any particular application, the reinforcing bulwark 18 may be formed by a protrusion that extends from a "top" wall. Further, in a given application, what is described herein as "a bottom wall" may in fact lie above a "top" wall, or vice-versa.

Structural member 10 may be formed of any material capable of being blow molded, but is preferably a thermoplastic resin. Preferred thermoplastic resins include polyethylene, polypropylene, ethylene/vinyl acetate copolymers, polyvinyl chloride, ABS acrylonitrile/butadiene/styrene, polyamide, polystyrene, polyester, and engineering plastics, e.g., polycarbonate and modified polyphenylene ether.

If used, the cover material 13 is preferably a fabric having in some embodiments outwardly protruding fibers, e.g., a knitted fabric, a woven fabric, or a non-woven fabric. For example, the fabric may include natural fibers, such as cotton, hemp, wool, and silk. Regenerated fibers can be used, e.g., viscose rayon and cupro-ammonium rayon, semi-synthetic fibers, e.g., acetate and rayon, synthetic fibers, e.g., nylon, polyester, acrylic, vinylon, polypropylene, and polyurethane, and blends of these fibers. In some embodiments, the cover material 13 may be provided in the form of an extruded sheet. The fabric is preferably raised or cut so that the fibers protrude in a direction perpendicular to the plane in which the fabric is spread.

As noted earlier, the hollow structural member 10 of the present invention is suitable for use in a variety of applications, e.g., in the building and automotive industries. In building applications, for instance, the hollow structural member may be used as an interior wall, a partition, or a door. In automotive applications, the hollow structural member may be used for such applications as a head rest, an arm rest, a seat back, a tail gate, a rear parcel shelf, or a cargo floor lid. It should be appreciated, however, that this list of applications should not be construed in a limiting manner and is merely a non-exhaustive list of the environments of possible use of the disclosed invention.

The Process

If desired, an overlay material 13 (see FIGS. 2-4) having outwardly protruding fibers is placed between a first mold half 21 and a first portion of a parison 24 to be formed into a top wall such that the fibers face the first mold half. The first mold half and a second mold half 22 having a movable blade 25 positioned therein are then brought into a closed position. Next, the movable blade 25 is moved into a cavity 26 defined by the first and second mold halves to form a protrusion 18 (FIG. 4) in a second portion of the parison to be formed into a bottom wall. The protrusion has a tip integrally joined to the first portion of the parison. Next, the movable blade 25 is retracted within the second mold half. Finally, a pressurized gas, e.g., air, is introduced into the parison such that the parison is pressed against the first and second mold halves to bond the overlay material (if present) to the top wall without substantial matting of the fibers and opposing sides of the protrusion are pressed together to form a double-walled bulwark.

Figure 2:
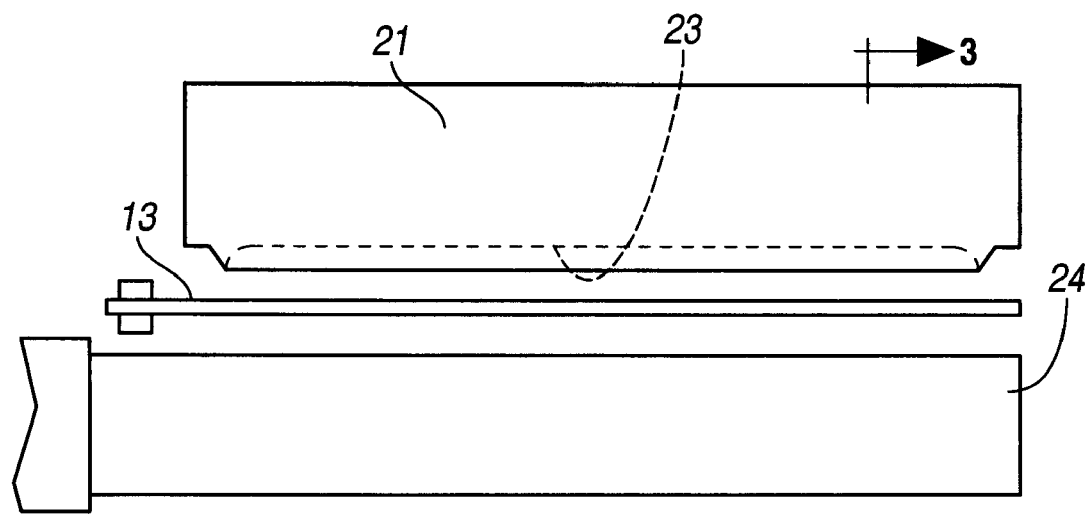
FIG. 2 shows a partially cutaway elevational view of a mold which illustrates one way to make a hollow structural member of the invention.

It should be appreciated that the manufacturing apparatus depicted in FIG. 2 is merely one of several embodiments of the manufacturing apparatus that may usefully be practiced with the present invention. It should be appreciated, for example, that only two blades are shown. In practice, there may be fewer than or more than two blades that can usefully be deployed. Preferably, regardless of the manufacturing apparatus used, the reinforcing bulwarks extend substantially entirely across the width of the part from the inner face of the lower wall toward the inner face of the upper wall.

The movable blade or vein is preferably retracted within a time period effective to prevent substantial press marks from being formed in the overlay material. It is further preferred that the movable blade is retracted such that the tip of the movable blade extends from a surface of the second mold half which defines the cavity, thereby forming a notch in the surface outside of the bottom wall. The opposing sides of the protrusion are preferably pressed together such that the double-walled bulwark has integrally joined walls and an outer surface of the bottom wall is substantially planar. The pressurized gas is preferably at a pressure that does not exceed 10 kg/cm² to avoid substantial matting of the fibers on the overlay material.

In more detail, the process with primary reference to FIG. 2 shows mold halves 21 and 22 in an open state. If desired, cover material 13 is positioned between mold half 21 and parison 24 so that the fibers face cavity 23 of mold half 11. Moving blade 25 is slidably disposed in mold half 22 so that it can be protruded into and retracted from cavity 26 of mold half 22.

Figure 3:
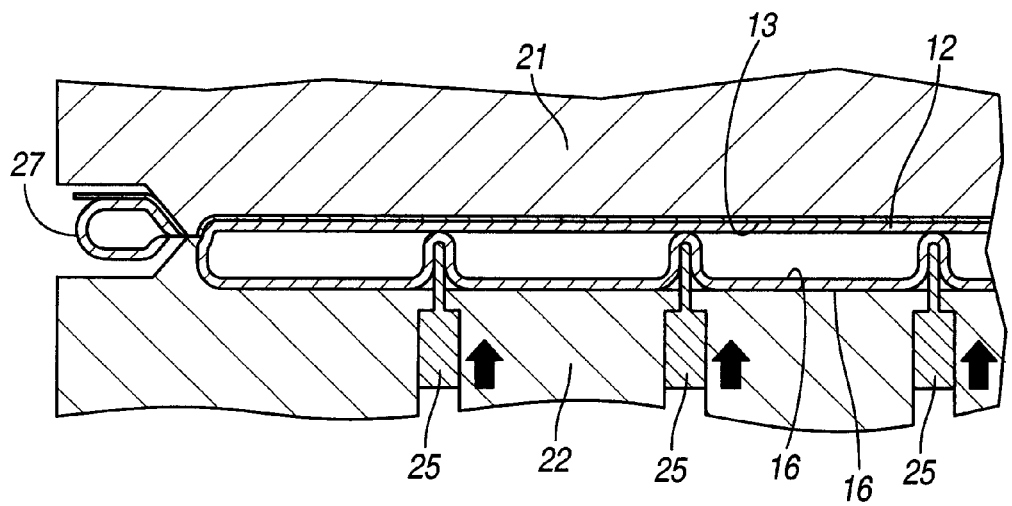
FIG. 3 is a cross-sectional view taken along line 3-3 of FIG. 2 which illustrates a step wherein the mold is in the closed position and movable blades and reinforcing members are extended.

At the outset of the blow molding operation, mold halves 21 and 22 are moved into a closed state. When the mold is closed, the interior of parison 24 is hermetically sealed from the exterior. In addition, if desired, cover material 13 is positioned between the portion of parison 24 which will become top wall 12 and cavity 23. As illustrated in FIG. 3, movable blades 25 extend from mold half 22 in the direction of cavity 26 so that parts of the portion of parison 24 which become bottom wall 16 are formed into rib-like protrusions that become bulwarks. Movable blades 25 preferably cause the leading faces 18 of such protrusions to contact the portion of parison 24 which becomes top wall 12 with a relatively small force that does not result in the formation of press marks on cover material 13. When the leading faces of the protrusions contact the portion of parison 24 which becomes top wall 12, the leading faces are integrally joined thereto (see leading faces 8 in FIGS. 10 and 14).

Next, movable blades 25 are retracted within mold half 22. Preferably, movable blades 25 are retracted such that the tips of movable blades 25 extend inwardly from the surface of mold half 22 which defines cavity 26. This alignment of movable blades 25 ensures that the outer surface of bottom wall 16 will include a notch 30 that may serve such purposes as a locating function and/or aesthetics. Movable blades 25 are preferably retracted within a relatively short time period to prevent substantial matting of the outwardly protruding fibers (when used) on cover material 13. It has been found that retracting the movable blades within about 10 seconds, and preferably within about 5 seconds, effectively avoids any substantial matting of the fibers on the overlay material.

To provide added stiffness to the structural member 10, the movable blades 25 support a reinforcing members 18 (FIGS. 1, 3-4). Alternate embodiments of the reinforcing members 18 are depicted in FIG. 5. As illustrated, they can be a plate (FIG. 5A), u-shaped (FIG. 5B), wedge-shaped (FIG. 5C), a hollow t-shape (FIG. 5D), and fork-shaped (FIG. 5E), and combinations of such shapes.

The reinforcing members may advantageously be provided with one or more through holes that may be presented in various shapes. Where present, such holes tend to allow the plastic to bond and enhance the trapping of the reinforcing insert by the walls of the bulwark 18. In general, the number of such holes can be an integer selected from the group consisting of 0, 1, 2, 3, . . . 1000.

The movable blades 25 place the reinforcing members 18 into the parison 24, where the reinforcing members become encapsulated by the parison 24. When the movable blades 25 are retracted, the reinforcing members 18 are left in place.

As illustrated in FIG. 4, a pressurized gas may be introduced into parison 24. The pressurized gas, e.g., air, increases the pressure within parison 24 and thereby expands parison 24 against cavity 23 and cavity 26. This causes the portion of parison 24 which becomes top wall 12 to be pressed against cover material 13 and, consequently, the side of cover material 13 which does not have fibers protruding therefrom is heated and thereby bonded to top wall 12.

Meanwhile, the increased pressure within parison 24 presses the opposing sides of the protrusions formed in the portion of parison 24 which becomes bottom wall 16 together so that they at least partially encapsulate the reinforcing members. As a result, the bulwarks 17 have a double-walled configuration and include reinforcing members 18 such as shown in FIGS. 1, and 3-5.

The hollow structural member of the present invention provides several significant advantages. One such advantage is that the structural member has improved performance in carrying loads. Another is a superior appearance because at least in some embodiments, no press marks are formed on the overlay material bonded to one of the walls of the structural member since a relatively small force is used in the formation of the double-walled bulwark. Another reason is that the fibers of the overlay material are free of any substantial matting because the degree to which the overlay material is pressed against the mold is minimized by controlling the pressure of the gas within the parison.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hollow structural member, comprising:
a top wall having an inner surface and an outer surface; and
a bottom wall opposing the top wall so as to define a void therebetween, the bottom wall having at least one bulwark formed therein, the at least one bulwark having a leading face which is joined to the inner surface of the top wall to form a double-walled bulwark bridging the void, the double-walled bulwark having a u-shaped reinforcing member with top and bottom edges extending laterally across the hollow structural member between the opposing walls so that neither the top nor bottom edges of the reinforcing member are visible from outside the top or bottom walls of the hollow structural member, the u-shaped reinforcing member also extending between the inner surface of the top wall and the bottom wall, and being encapsulated by the top wall, the bottom wall and the double-walled bulwark, the bottom wall having an outer surface that includes a notch that remains after the bulwark is formed.

2. The hollow structural member of claim 1, wherein the reinforcing member has a number of holes, the number being selected from the group consisting of 0, 1, 2 . . . 1000.

3. The hollow structural member of claim 1, wherein the reinforcing member has a bridge portion that is located proximate the upper wall so that a bond is formed between the bridge portion and the inner surface of the top wall for added strength.

4. The hollow structural member of claim 1, wherein the reinforcing member has an open area that is located proximate the bottom wall so that a movable blade can be removed therefrom after positioning the reinforcing member during formation.

5. The hollow structural member of claim 1, wherein the reinforcing member has a cross section that resembles a fork having tines that are located proximate the bottom wall and a curved handle portion located proximate the inner surface of the top wall.

6. The hollow structural member of claim 1, further including an overlay material bonded to the outer surface of the top wall.

7. The hollow structural member of claim 6, wherein the overlay includes a material selected from the group consisting of cotton, hemp, wool, silk, plastic, lacquer, a metal, a metal alloy, viscose rayon, cupro-ammonium rayon, acetate, rayon, nylon, polyester, acrylic, vinylon, polypropylene, polyurethane, and combinations thereof.

8. The hollow structural member of claim 1, wherein the top and bottom walls include a thermoplastic resin selected from the groups consisting of polyethylene, polyporpylene, ethylene/vinyl acetate copolymers, polyvinyl chloride, acrylonitrile/styrene/butadiene, polyamide, polystyrene, polyester, polycarbonate, and modified polyphenylene ether.

9. A hollow structural member, comprising:
a top wall with an inner surface;
a bottom wall opposing the top wall so as to define a void therebetween, the bottom wall having at least one bulwark extending therefrom, the at least one bulwark having a leading face which is joined to the inner surface of the top wall to form a double-walled bulwark bridging the void, said double-walled bulwark having a u-shaped reinforcing member held between the opposing walls so that neither top nor bottom edges of the reinforcing member are visible from outside the top or bottom walls of the hollow structural member, the u-shaped reinforcing member extending between the inner surface of the top wall and the bottom wall, and being encapsulated by the top wall, the bottom wall and the bulwark the bottom wall having an outer surface that includes a notch that remains after the bulwark is formed; and
an overlay material bonded to the outer surface of the top wall.

* * * * *